US012805427B2

(12) United States Patent
Strang et al.

(10) Patent No.: US 12,805,427 B2
(45) Date of Patent: Nov. 24, 2026

(54) SEED RECEIVER AND PATH CONSTRAINER FOR AN AGRICULTURAL PLANTER SEED ORIENTATION SYSTEM

(71) Applicant: Precision Planting LLC, Tremont, IL (US)

(72) Inventors: Keith T. Strang, Zimmerman, MN (US); Mitchell R. Dille, Litchfield, MN (US)

(73) Assignee: Precision Planting LLC, Tremont, IL (US)

( * ) Notice: Subject to any disclaimer, the term of this patent is extended or adjusted under 35 U.S.C. 154(b) by 288 days.

(21) Appl. No.: 18/690,332

(22) PCT Filed: Oct. 10, 2022

(86) PCT No.: PCT/IB2022/059694
§ 371 (c)(1),
(2) Date: Mar. 8, 2024

(87) PCT Pub. No.: WO2023/062507
PCT Pub. Date: Apr. 20, 2023

(65) Prior Publication Data

US 2024/0373780 A1 Nov. 14, 2024

Related U.S. Application Data

(60) Provisional application No. 63/254,488, filed on Oct. 11, 2021.

(51) Int. Cl.
*A01C 7/20* (2006.01)
*A01C 7/16* (2006.01)

(52) U.S. Cl.
CPC ................ *A01C 7/206* (2013.01); *A01C 7/16* (2013.01)

(58) Field of Classification Search
CPC .................................. A01C 7/206; A01C 7/16
See application file for complete search history.

(56) References Cited

U.S. PATENT DOCUMENTS

| | | |
|---|---|---|
| 2,618,373 A | 11/1952 | Stanley |
| 2,783,918 A | 3/1957 | Bramblett |
| 2,935,957 A | 5/1960 | Denton |

(Continued)

FOREIGN PATENT DOCUMENTS

| | | |
|---|---|---|
| CN | 101663935 B | 10/2012 |
| CN | 102893723 B | 10/2014 |

(Continued)

OTHER PUBLICATIONS

European Patent Office, Search Report for related PCT Application No. PCT/IB2022/059694 dated Mar. 3, 2023, 22 pages.

*Primary Examiner* — Matthew R Buck

(57) ABSTRACT

A seed orientation system. The seed orientation system (30) has a curved seed path upon which singulated seeds traverse that orients the singulated seeds in a selected orientation, an air flow directed along the curved path to entrain and accelerate the singulated seeds, and a seed exit path (50) to deposit the oriented singulated seeds into the ground in a selected planting orientation. The seed-delivery device also has a seed receiver and path constrainer (20) configured to receive the singulated seeds and constrain the singulated seeds to the seed path.

22 Claims, 6 Drawing Sheets

(56) References Cited

U.S. PATENT DOCUMENTS

| | | | | |
|---|---|---|---|---|
| 3,134,346 | A | 5/1964 | Mann | |
| 3,195,485 | A | 7/1965 | Ward | |
| 3,217,674 | A | 11/1965 | Williams | |
| 3,482,735 | A | 12/1969 | Goulter | |
| 3,623,595 | A | 11/1971 | Brown et al. | |
| 3,636,897 | A | 1/1972 | Brink | |
| 3,790,026 | A | 2/1974 | Neumeister | |
| 3,848,552 | A | 11/1974 | Erickson et al. | |
| 3,860,146 | A | 1/1975 | Bauman et al. | |
| 3,881,631 | A | 5/1975 | Loesch et al. | |
| 3,891,120 | A | 6/1975 | Loesch et al. | |
| 3,913,503 | A * | 10/1975 | Becker | A01C 7/04 221/124 |
| 4,026,437 | A * | 5/1977 | Biddle | A01C 7/0445 111/179 |
| 4,798,151 | A | 1/1989 | Rodrigues, Jr. et al. | |
| 5,082,141 | A | 1/1992 | Martin et al. | |
| 5,524,559 | A | 6/1996 | Davidson | |
| 5,601,209 | A | 2/1997 | Barsi et al. | |
| 5,603,269 | A | 2/1997 | Bassett | |
| 5,974,988 | A | 11/1999 | Stufflebeam et al. | |
| 6,148,748 | A | 11/2000 | Bardi et al. | |
| 6,178,901 | B1 | 1/2001 | Anderson | |
| 6,332,413 | B1 | 12/2001 | Stufflebeanm et al. | |
| 6,827,029 | B1 | 12/2004 | Wendte | |
| 7,270,064 | B2 | 9/2007 | Kjelsson et al. | |
| 7,426,894 | B2 | 9/2008 | Peterson et al. | |
| 7,490,565 | B2 * | 2/2009 | Holly | A01C 7/044 111/179 |
| 7,509,915 | B2 | 3/2009 | Memory | |
| 7,735,626 | B2 | 6/2010 | Cope et al. | |
| 7,814,849 | B1 | 10/2010 | McOmber | |
| 7,997,415 | B2 | 8/2011 | Mongan et al. | |
| 8,245,439 | B2 | 8/2012 | Deppermann et al. | |
| 8,286,387 | B2 | 10/2012 | Becker et al. | |
| 8,336,471 | B2 | 12/2012 | Gilstring | |
| 8,757,074 | B2 | 6/2014 | Cruson | |
| 8,789,482 | B2 * | 7/2014 | Garner | A01C 7/16 111/171 |
| 9,591,798 | B2 | 3/2017 | Horsch | |
| 9,706,702 | B2 * | 7/2017 | Wendte | A01C 7/046 |
| 9,814,176 | B2 * | 11/2017 | Kowalchuk | A01C 7/20 |
| 9,861,025 | B2 | 1/2018 | Schaefer et al. | |
| 9,924,629 | B2 | 3/2018 | Batcheller et al. | |
| 9,936,625 | B2 * | 4/2018 | Wendte | A01C 7/046 |
| 10,412,879 | B2 | 9/2019 | Cruson | |
| 10,785,905 | B2 | 9/2020 | Stoller et al. | |
| 10,952,366 | B2 * | 3/2021 | Rhodes | A01C 7/20 |
| 11,596,095 | B2 * | 3/2023 | Johnson | A01C 7/20 |
| 2002/0144637 | A1 | 10/2002 | Wendling et al. | |
| 2003/0005867 | A1 | 1/2003 | Richard | |
| 2003/0159631 | A1 * | 8/2003 | Sauder | A01C 7/04 111/171 |
| 2006/0278726 | A1 | 12/2006 | Holly | |
| 2008/0257237 | A1 | 10/2008 | Friesen et al. | |
| 2012/0042813 | A1 | 2/2012 | Liu et al. | |
| 2013/0152836 | A1 | 6/2013 | Deppermann et al. | |
| 2015/0101518 | A1 | 4/2015 | Arnold et al. | |
| 2015/0223392 | A1 * | 8/2015 | Wilhelmi | A01C 7/0445 111/171 |
| 2019/0098827 | A1 * | 4/2019 | Gilbert | A01C 7/102 |
| 2022/0087097 | A1 * | 3/2022 | Leifker | A01C 7/20 |

FOREIGN PATENT DOCUMENTS

| | | | |
|---|---|---|---|
| CN | 102918963 | B | 12/2014 |
| CN | 103609227 | B | 5/2016 |
| CN | 104938079 | B | 8/2016 |
| CN | 104255130 | B | 2/2017 |
| CN | 107439101 | B | 4/2020 |
| CN | 107371486 | B | 9/2022 |
| CN | 108207212 | B | 1/2023 |
| DE | 102019127467 | A1 | 4/2021 |
| EP | 2901832 | B1 | 11/2017 |
| GB | 1530263 | A | 10/1978 |
| WO | 2005011358 | A1 | 2/2005 |
| WO | 2005117564 | A1 | 12/2005 |
| WO | 2021155008 | A1 | 8/2021 |

* cited by examiner

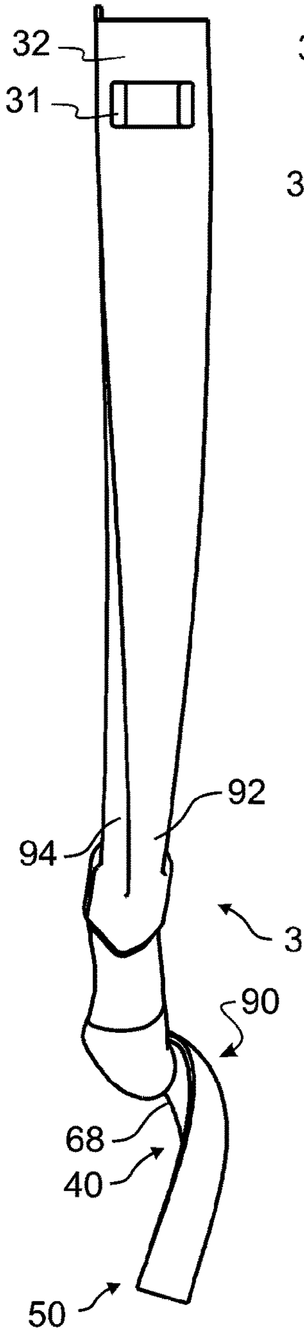
FIG. 6
FIG. 7
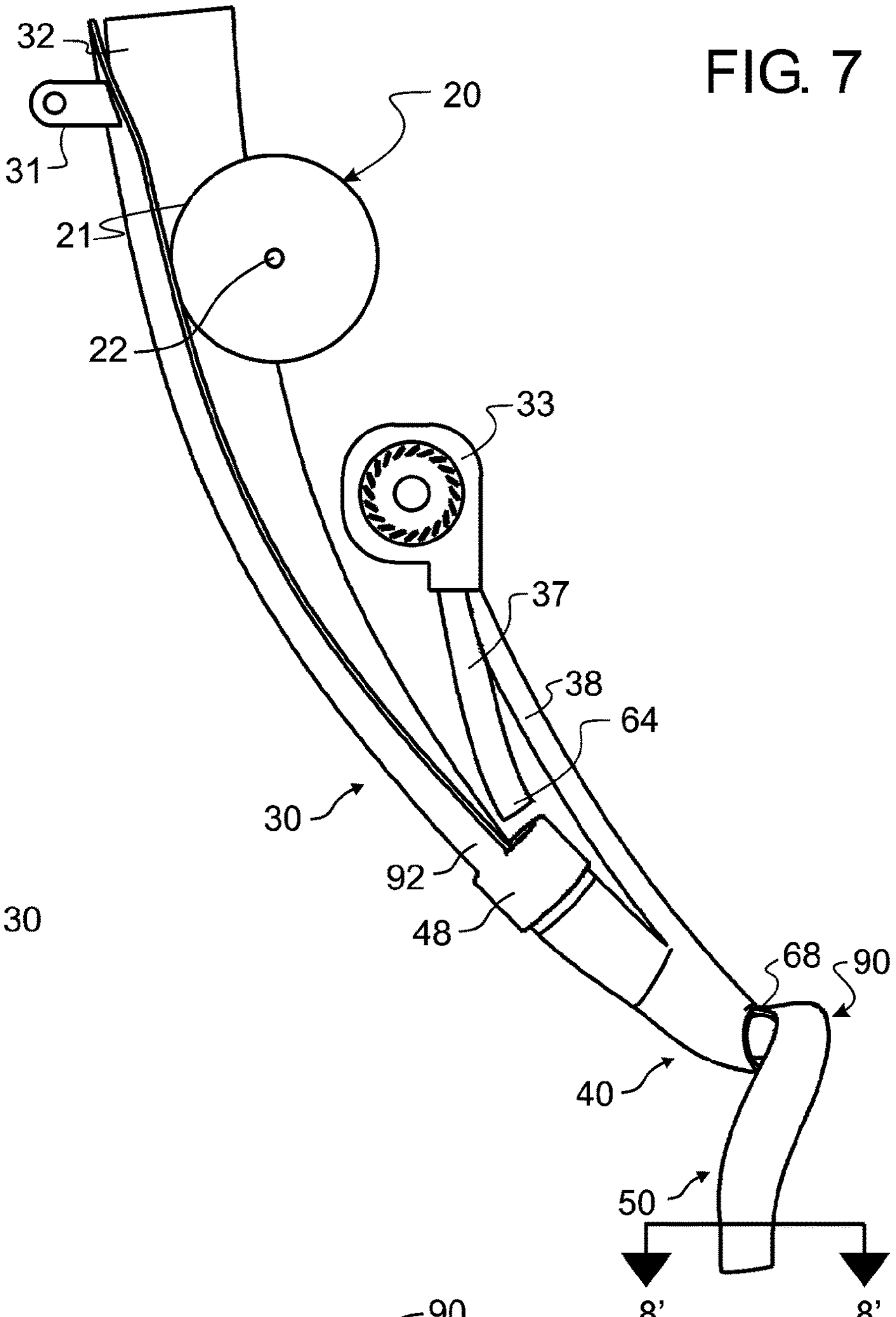
FIG. 8

SEED RECEIVER AND PATH CONSTRAINER FOR AN AGRICULTURAL PLANTER SEED ORIENTATION SYSTEM

CROSS-REFERENCE TO RELATED APPLICATIONS

The present application is a national phase entry under 35 U.S.C. § 371 of International Patent Application PCT/IB2022/059694, filed Oct. 10, 2022, designating the United States of America and published in English as International Patent Publication WO 2023/062507 A1 on Apr. 20, 2023, which claims the benefit of U.S. provisional patent application 63/254,488 filed 11 Oct. 2021, which is incorporated herein by reference in its entirety.

FIELD

The present disclosure pertains generally to a seeding device for agricultural row crop planters, and more specifically to a seed orientation system, apparatus, and method for placing seeds in the soil in a selected growing orientation.

BACKGROUND

Agricultural row crop planters typically include a row unit having a seed hopper connected to a seed metering system that delivers seeds into a furrow formed by disc opener blades. A plurality of row units are typically mounted in parallel along a tool bar which is attached to a tractor. For example, it is common as of the time of this filing to have, four, eight, sixteen, twenty-four, thirty-six row, or forty-eight units attached to a single tractor.

Within a typical prior art row crop planter, seeds are delivered in bulk from the seed hopper to the metering system. The metering system precisely singulates the bulk seeds and will most preferably provide these singulated seeds at very predictable and repeatable time intervals. The row crop planter subsequently delivers one seed at a time into the ground, typically into a furrow cut by the opener blades. The speed of release of individual seeds from the metering system is preferably adjustable, to properly control the spacing of the seeds based upon the speed of the tractor and row crop planters relative to the ground.

Optimizing seed orientation, tip down with germ facing adjacent row during planting, results in a quicker and more even emergence, increased light interception, and faster canopy closure resulting in reduced weed pressure. When the tip of the seed is pointed down into the ground, the root and coleoptiles do not waste time and energy wrapping around the seed. Thus the crop has quicker and more even emergence and greater stand uniformity.

There are further production advantages when the germ of the seed is orientated toward an adjacent row, generally perpendicular to the row the seed is in. The leaf structure of corn plants aligns with the germ/embryo direction. When the germ is facing toward the adjacent row, the leaves orient between rows and not over neighboring plants within the same row. As a result of optimized leaf structure there is greater light interception for the plant. Moreover, the optimized leaf structure provides a quicker canopy closure which preserves moisture and reduces weed pressure.

In contrast, with random orientation some plants emerge earlier or later than the majority of the crop, and some plants shade neighboring plants. Both contribute to substantially reduced yields, as evidenced by a number of studies. One exemplary thesis on the topic entitled "The Effects of Planting Techniques on Maize Grain Yield and Silage Production," by Tyler D. Kaufman in an Illinois State University publication dated Sep. 12, 2013 establishes that an optimal seed orientation can improve yield by 14-19% for a given field. Clearly, there is much economic incentive for an agricultural row planter that provides this optimum seed orientation.

Some early pioneers devised apparatus to selectively orient seed. Exemplary U.S. patents include: U.S. Pat. No. 3,134,346 by Mann; U.S. Pat. No. 3,195,485 by Reynolds; and U.S. Pat. No. 3,217,674 by Williams. Each of these disclose narrow slots through which a seed passes, thereby forcing the flat major surfaces of the seed to align with the walls of the slot. This provides orientation of the flat major surfaces but fails to orient the seed with the point down. In addition, the seeds must be of predictable size, preferably pre-graded as described by Mann. Unfortunately, as also noted by Mann, even with graded seed there will be errant sizes of seed in a batch. Furthermore, and even with perfectly graded seed, during planting in the field these narrow slots are easily clogged by other debris and are difficult and time-consuming to clean.

Another approach to proper orientation of a seed is the use of a holder for the seed. One type of holder is illustrated by U.S. Pat. No. 3,636,897 by Brink, which uses seeds pre-encapsulated into a disk-shaped seed capsule. As long as the seeds are properly oriented within the disk, then the seeds are fed through a gearing structure that retains and orients the disk. As may be appreciated, this machinery is unaware of the orientation of the seed point, and so like Mann and Reynolds just described, this provides orientation of the flat major surfaces, but fails to orient the seed with the point down. CN101663935 by Lu et al. improves upon the Brink patent by providing a seed holder that is uniquely shaped to establish orientation. Nevertheless, these seed encapsulations incur undesired cost associated with the creation of the seed capsule, extra volume required for seed storage prior to planting, and the potential for premature germination or spoilage as a result of encapsulation.

Another very common seed holder is an indeterminate length tape to which a seed is adhered. Seed tapes very precisely and uniformly space the seeds, and other substances such as herbicides or fertilizers may be disposed on the tape as well to aid in the growth and development of the seed. Such tapes have been manufactured for many years, particularly to benefit hobby gardeners, since the gardener may then much more quickly and precisely plant, with little or no seed waste. An exemplary U.S. published patent application illustrating larger commercial planters using seed tape is US2013/0152836 by Deppermann et al.

Some artisans have recognized that the seeds may be oriented when adhered to the tape. Exemplary Chinese published patents applications include: CN103609227 by He et al. and CN104255130 by He et al.

Unfortunately, and similar to the seed capsules, there is: extra expense associated with the creation of the seed tape, including extra steps and handling if seeds are to be oriented; extra volume required for seed storage prior to planting; and the potential for premature germination or spoilage as a result of placement on the tape. In addition, the adhesion of the seed to the tape can be unpredictable and hard to adequately control, the tape acts as a waste material that can interfere with seed germination and growth, and the tape is quite difficult to reliably insert into the ground and then properly cover at high speeds. As described in CN108207212 by Chen et al. and the aforementioned CN103609227 and CN104255130, they suffer from the "following deficiencies: 1) The seed belt is difficult to manufacture and lay out, and the efficiency is low; 2) The seed reel is bulky and inconvenient to store."

As an alternative to the seed tape, CN108207212 proposes a cartridge that contains oriented corn seed. The cartridge has been designed to make manufacturing and seed insertion easier, and to reduce the bulk of a seed tape. Nevertheless, use of the cartridge still requires moving the seed from the cartridge to the soil while maintaining orientation, and the patent fails to disclose how this is achieved. As noted herein above, movement of the seed without losing orientation has been an obstacle that has not been overcome in the prior art. In addition, the cartridge still runs the challenges experienced even with the earliest patent by Mann, including: challenges of proper handling and storage in the cartridge of errant sizes and geometries of seed; tendency for clogging and jamming during planting; difficulties and time-consumption required to clean; and in the case of the magazine, the necessarily limited size and need for frequent changing when planting large areas.

For scientific testing and laboratory analysis, some artisans have painted corn seed while still on the kernel with iron-containing paint. Once the corn is painted, then it is separated from the cob. The iron paint then allows the corn seeds to be oriented by application of a magnetic field. Exemplary U.S. and Foreign patents and published applications include: U.S. Pat. No. 7,735,626 by Cope et al.; U.S. Pat. No. 7,997,415 by Mongan et al.; and U.S. Pat. No. 8,286,387 by Becker et al. This technique is very innovative and can be extremely useful for various laboratory procedures, but too much iron in the soil can stunt plant growth and discolor foliage, weakening and eventually killing the plant. Continued application of iron through multiple seasons can result in iron accumulations within the soil as well, compounding the problem. Consequently, while developed for laboratory use, no techniques are disclosed to handle seed during planting using this technique.

A number of artisans have applied robotics, often with computer vision systems, to orient seeds and plants. Exemplary U.S. and Foreign patents and published applications include: U.S. Pat. No. 2,935,957 by Denton; U.S. Pat. No. 8,245,439 by Deppermann et al.; U.S. Pat. No. 9,924,629 by Batcheller et al.; US2019/0223372 by Koch et al.; US2019/0230846 by Koch et al.; US2019/0289778 by Koch et al.; US2019/0289779 by Koch et al.; US2020/0187410 by Bredeweg; and WO2020/247985 by Leifker et al. While robotics and vision technologies have advanced, the combination of a seed-orienting robotics system with a vision system disposed close to the ground is nevertheless expensive, difficult to operate at high speed, and prone to failure in the harsh planting environment. As noted herein above, with twenty-four or thirty-six rows being planted simultaneously, the likelihood of failure is also twenty-four or thirty-six times greater. When only one row crop planter fails, the entire machine is shut down, stopping planting of all rows.

While not related to seed orientation, a number of artisans have moved seed by air for transport through a planting apparatus. Such apparatus are sometimes referred to as air seed planters. Exemplary U.S. patents and published applications, include: U.S. Pat. No. 8,336,471 by Gilstring; U.S. Pat. No. 2,783,918 by Bramblett; U.S. Pat. No. 3,482,735 by Goulter; U.S. Pat. No. 3,790,026 by Neumeister; U.S. Pat. No. 3,848,552 by Bauman et al.; U.S. Pat. No. 3,860,146 by Bauman et al.; U.S. Pat. No. 3,881,631 by Loesch et al.; U.S. Pat. No. 3,891,120 by Loesch et al.; U.S. Pat. No. 5,524,559 by Davidson; U.S. Pat. No. 5,601,209 by Barsi et al.; U.S. Pat. No. 5,603,269 by Bassett; U.S. Pat. No. 6,148,748 by Bardi et al.; U.S. Pat. No. 6,827,029 by Wendte; U.S. Pat. No. 7,270,064 by Kjelsson et al.; U.S. Pat. No. 7,509,915 by Memory; U.S. Pat. No. 8,757,074 by Cruson; U.S. Pat. No. 9,591,798 by Horsch; U.S. Ser. No. 10/412,879 by Cruson; and US2020/0128725 by Rhodes et al.. However, the air flow is used for transport only, and none of these patents make any attempt to orient a seed or provide any way to ensure the seed will remain oriented into the soil and while being covered with soil.

In addition to the Williams patent, other artisans have devised improved furrow opening and forming apparatus. Exemplary U.S. patents include: U.S. Pat. No. 4,798,151 by Rodrigues, Jr. et al. and U.S. Pat. No. 6,178,901 by Anderson.

Other diverse and somewhat less relevant seed and leaf orientation apparatus are illustrated in U.S. and Foreign patents and published applications include: U.S. Pat. No. 2,618,373 by Hathaway; U.S. Pat. No. 3,623,595 by Brown et al.; U.S. Pat. No. 7,814,849 by McOmber; U.S. Pat. No. 9,861,025 by Schaefer et al.; U.S. Ser. No. 10/785,905 by Stoller et al.; CN102893723 by Hou et al.; CN102918963 by Hou et al.; CN107371486 by Chen et al.; and CN107439101 by Duan et al. Interestingly, the latter CN107439101 discusses both CN102893723 by Hou et al. and another, CN102918963 also by Hou et al., noting that the CN102893723 device structure is complex, the success rate of the orientation is low, and the corn seed cannot be operated at a distance; and noting that the CN102918963 device is complex, and the corn seed orientation and the distance are separately carried out, such that when the corn seed which is oriented in a flat-lying position is positioned (presumably for planting or the like), the original orientation result is easily destroyed with the root tips of the radicles no longer aligned in a forward direction.

In spite of the long-standing substantial economic incentive, long-term awareness, and substantial research and development that has been conducted, evidenced by the fact that the Kaufman paper as of this writing is more than seven years old, that several studies referenced by Kaufman are more than thirty years old, that the Mann, Reynolds, and Williams patents are more than fifty years old, and the many other patents and publications described herein above, proper and consistent seed orientation has not been successfully economically implemented in commercial agricultural row planters. Thus, there remains a need for a seed orientation system that economically and efficiently plants the seeds tip down and germ facing the next row in a furrow.

The present inventors disclose a seed orientation system that economically and efficiently plants the seeds tip down and germ facing the next row in a furrow in co-pending U.S. Patent Publication Nos. US2022/0192079A1 and US20200367425A1. While the inventions disclosed in these co-pending patent applications demonstrate substantial improvements in seed orientation, the present inventors have recognized opportunity for improved efficacy in at least some applications and environments.

BRIEF SUMMARY

In a first manifestation, disclosed is an agricultural planter. Within the agricultural planter a seed source is configured to provide at least one seed. A seed orientation system has a seed path upon which the at least one seed traverses that is configured to orient the at least one seed upon the seed path in a selected traversing orientation, and a seed exit path configured to deposit the oriented seed into the earth in a selected planting orientation. A seed receiver and path constrainer is configured to receive the at least one seed from the seed source and constrain the at least one seed to the seed path.

In a second manifestation, disclosed is an agricultural row unit for planting seeds. A frame is configured to be coupled to a toolbar. A seed-trench opening assembly is carried by the frame and configured to form a seed trench. A seed-delivery device is carried by the frame and configured to deliver seeds to the seed trench. The seed-delivery device has a seed reservoir containing a plurality of seeds, a seed meter having a metering disc configured to receive and singulate the plurality of seeds, and a seed orientation system. The seed orientation system has a curved seed path upon which the singulated seeds traverse that is configured to orient the singulated seeds upon the seed path in a selected traversing orientation, an air flow directed along the curved path configured to entrain and accelerate the singulated seeds, and a seed exit path configured to deposit the oriented singulated seeds into the earth in a selected planting orientation. The seed-delivery device also has a seed receiver and path constrainer configured to receive the singulated seeds from the seed source and constrain the singulated seeds to the seed path. A seed-trench closing assembly is carried by the frame and configured to close the seed trench over seeds in the seed trench.

In a third manifestation, disclosed is a method of planting with a row unit. According to the method, a seed trench is formed in soil with the row unit. A metering disc carried by the row unit singulates the seeds. The singulated seeds are transferred from the metering disc to a seed path. The singulated seeds are captured between the seed path and a seed path constrainer that moves relative to the seed path, thereby constraining the singulated seeds to the seed path. The constrained singulated seeds are entrained and accelerated upon the seed path in an air stream. The constrained singulated seeds are oriented within the seed path. The oriented constrained singulated seeds are dispensed from the seed path into the seed trench, and the seed trench is closed with a seed-trench closing assembly.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention/disclosure will now be described, by way of example only, with reference to the accompanying drawings, in which:

FIGS. 4-10 illustrate a seed receiver and path constrainer in combination with an agricultural planter seed orientation system of FIG. 1 from rear and top projected view, rear elevational view, front elevational view, right side elevational view, sectional view taken along section line 8', bottom and rear projected view, and left side elevational view, respectively.

DETAILED DESCRIPTION

All references cited herein are incorporated herein in their entireties. If there is a conflict between definitions herein and in an incorporated reference, the definition herein shall control.

Figure 1:
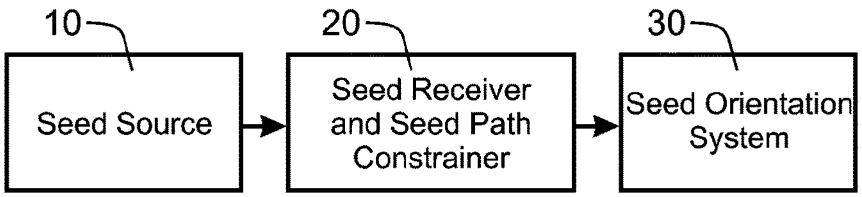
FIG. 1 illustrates an embodiment seed receiver and path constrainer in combination with an agricultural planter seed orientation system, the combination designed in accordance with one embodiment by schematic block diagram.

In an embodiment illustrated by simplified block diagram in FIG. 1, a seed source 10 provides at least one seed, and usually a large reservoir of seeds that are sequentially delivered, to seed receiver and seed path constrainer 20. As will be apparent from the descriptions herein below, seed source 10 in an embodiment will deliver singulated seeds sequentially to seed receiver and seed path constrainer 20 at timed intervals appropriate for the instantaneous row planter travel speed.

Seed source 10 may for exemplary and non-limiting purpose comprise a prior art row unit having a seed meter and seed tube. The seed meter may be any commercially available seed meter, such as the finger type meter or vacuum seed meter, such as the vSet® meter, available from Precision Planting LLC, 23333 Townline Rd, Tremont, Ill. 61568. In such exemplary case, seed source 10 might comprise a commercial row unit designed for the purpose of delivering a seed from a reservoir into a furrow, for exemplary and non-limiting purposes such as that illustrated by U.S. Pat. No. 5,974,988 by Stufflebeam et al.; U.S. Pat. No. 6,332,413 by Stufflebeam et al.; U.S. Pat. No. 8,336,471 by Gilstring; U.S. Pat. No. 8,789,482 by Garner et al.; and PCT Publication WO2013/049198 by Radtke et al. As shown in those patents, the row unit is typically mounted to a tool bar that attaches to a tractor or similar towing device along with other identical or similar planting row units. While not solely limited thereto, row units are presently found in even number groups from a few units to as many as forty-eight row units.

In alternative embodiments any other suitable seed source will be used, with or entirely without a row unit. In those alternative embodiments where seed source 10 lacks seed singulation or seed timing, seed receiver and seed path constrainer 20 will be provided with suitable means to perform singulation and timing as seeds are received from seed source 10. As observed from the patents and publications herein above and other similar teachings known to those skilled in the industry, there are many various known apparatus and methods for performing singulation and timing that will be incorporated into a seed receiver and seed path constrainer 20 by those reasonably skilled in the field when provided in combination with the teachings of the present disclosure.

Once seeds are received and properly singulated and timed, they are then delivered to seed receiver and seed path constrainer 20. Seeds will typically arrive at seed receiver and seed path constrainer 20 with substantial inertia and momentum that do not align with and follow the seed path. As a result, many seeds arrive in a tumbling and/or bouncing state.

In accord with the teachings of the present disclosure, seed receiver and seed path constrainer 20 is provided to stabilize and constrain these individual and sequential seeds to slide upon a seed path. For the purpose of the present disclosure, a seed constrained to sliding upon a seed path will be substantially free of tumbling or bouncing and will instead slide along the seed path in substantially continuous contact therewith. When the seed is so constrained, there will be a force generated by the friction of the seed sliding over the surface, or an equivalent thereto, that is in a direction generally opposite to the direction of travel of the seed along the seed path.

Seeds constrained to the seed path are then delivered to a seed orientation system 30 that orients the seed relative to the seed path in a predetermined and selected orientation that will lead to the seed being planted in a tip-down, germ facing adjacent row orientation. In accord with an embodiment of the present disclosure, seed orientation system 30 orients the seed through generation of a force generally in the direction of travel of the seed that interacts with the seed, and the generation of a force by the friction of the seed sliding over the surface or equivalent thereto. The frictional force is in a direction generally opposite to the direction of travel of the seed along the seed path.

Figure 2:
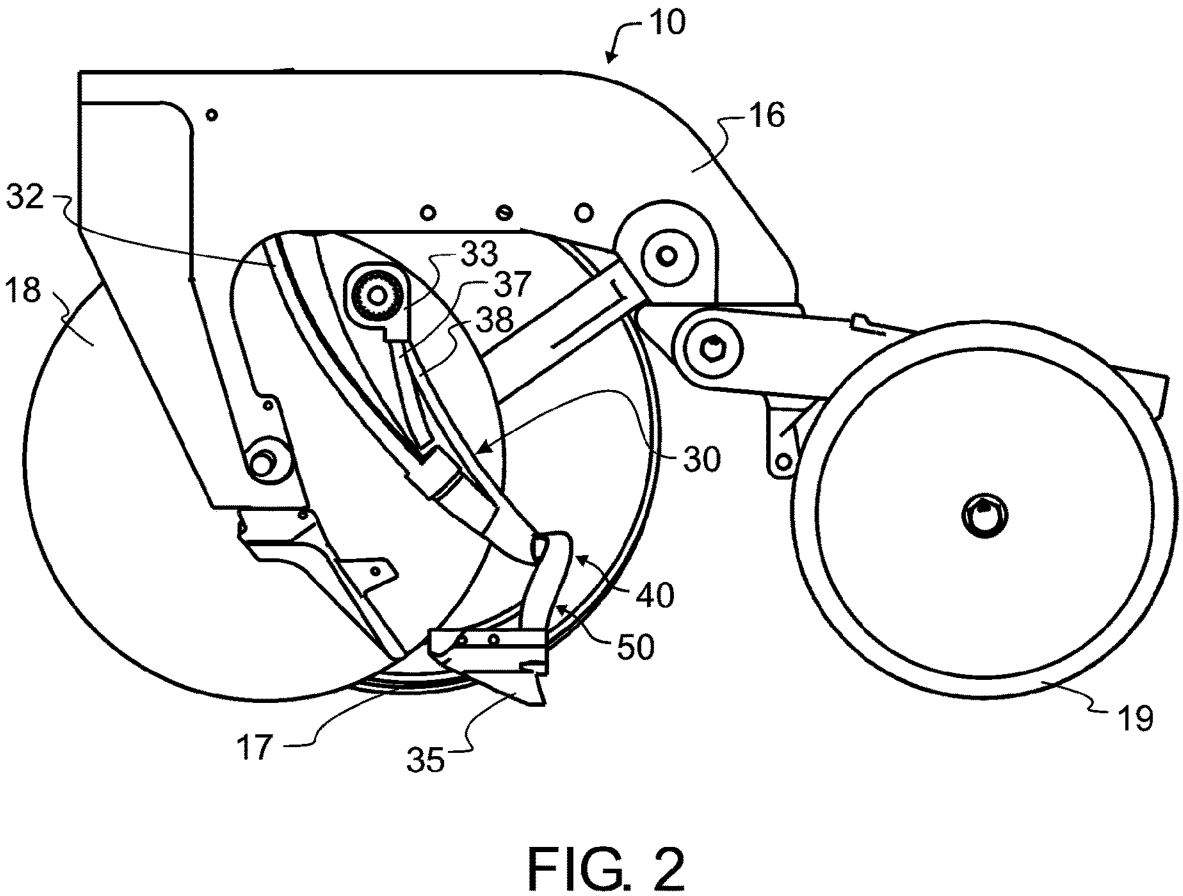
FIGS. 2 and 3 illustrate a seed receiver and path constrainer in combination with an agricultural planter seed orientation system of FIG. 1 in further combination with an agricultural row unit, from side elevational view and rear and top projected view, respectively.
Figure 3:
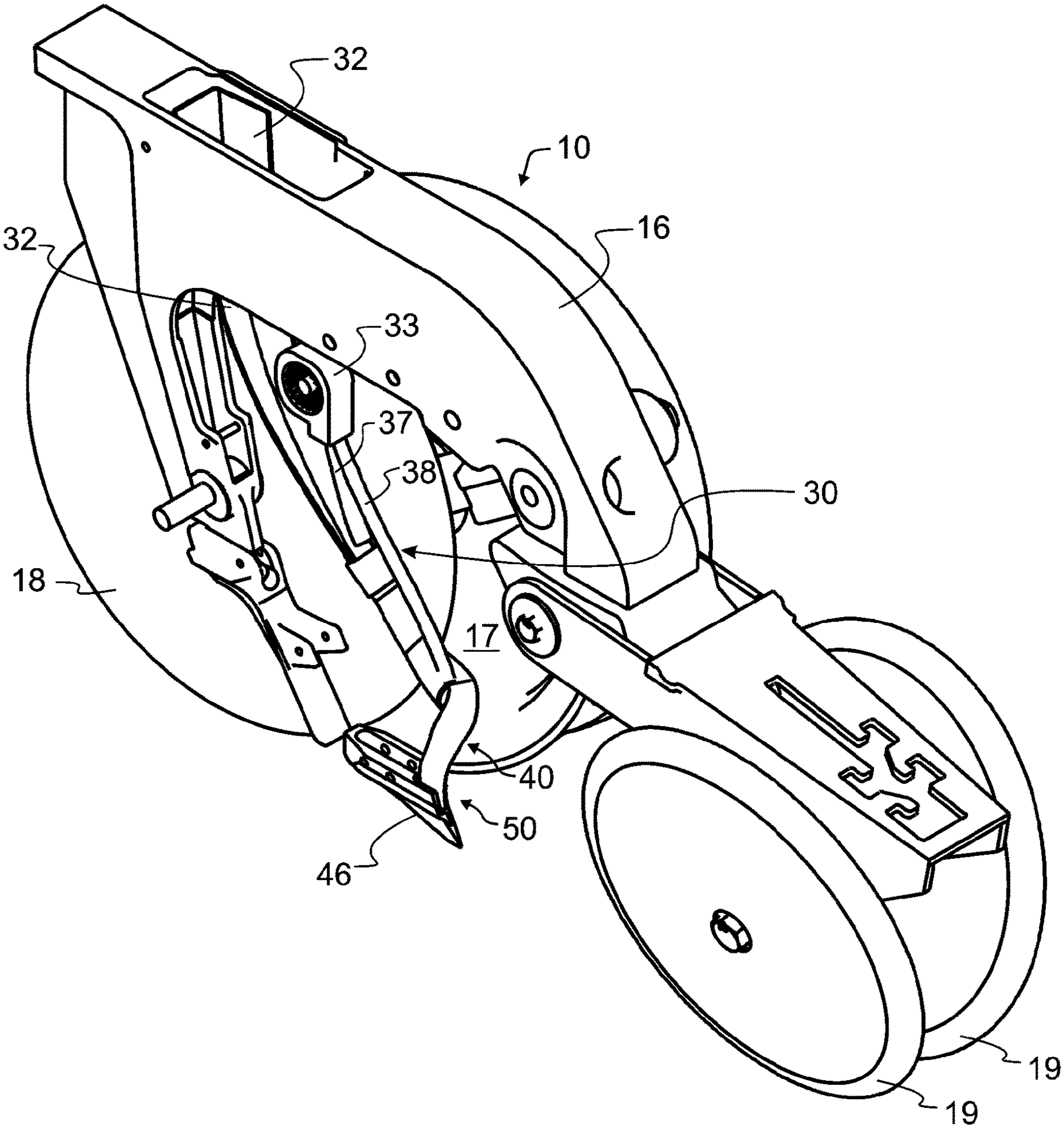

An exemplary seed source 10 defined by a commercial row unit is illustrated in FIGS. 2 and 3, to which an embodiment combination seed path constrainer 20 and seed orientation system 30 are affixed. A typical row unit will include a supporting frame or shank 16, a seed meter (not illustrated), a seed hopper (not illustrated), some type of opener blade(s) 18 or the like that cuts a primary furrow, at least one closing wheel 19 that closes the soil over a seed furrow after a seed has been planted therein, and at least one gauge wheel 17 that controls the depth of planting.

In the typical prior art commercial row unit, the seed hopper stores a supply of seed for planting. The seed moves from the seed hopper to a seed meter. The seed meter singulates the seed at a selected spacing for delivery to the ground. From the seed meter, again in a typical prior art row unit, seed is delivered to the ground through a seed tube.

While the seed receiver and path constrainer 20 is not visible in FIGS. 2 and 3, a seed orientation system 30 is illustrated therein. Seed orientation system 30 includes a seed collector 32 operably attached to a seed discharge from seed source 10, such as a prior art tube. Seed collector 32 gathers the seed and moves the seed to a seed orientation coil assembly 40. The seed passes through the helical path of the seed orientation coil assembly 40 to an oriented seed exit path 50. A sub-furrow opener 35 creates a wedge shaped trough within the furrow for capturing the oriented seed.

Movement of the seed throughout seed orientation system 30 is aided by an air stream. In some alternative embodiments the air is obtained from a central blower/fan such as is commonly found in prior art planters. However, in certain embodiments, seed orientation system 30 a blower 33 is provided to generate an air stream of selected velocity and volume. The air from blower 33 will be divided as selected and required for a particular design. In the embodiment illustrated in FIG. 2, a first portion of the air from blower 33 is used to generate an air stream that is directed to the seed riding surface 92 as the seed enters into a seed entrance aperture 48, and a second portion of the air from blower 33 is used to generate an air stream that is directed to the seed riding surface 92 as the seed enters an open-top and relatively small radius helical pathway 90 that defines seed orientation coil assembly 40. While helical pathway 90 is used in certain embodiments, in some alternative embodiments a curve is used to generate centrifugal force on the seed.

While air is preferred owing to ready availability, low cost, and presence of blowers on most equipment, it will be appreciated in alternative embodiments that other fluid sources will be provided. Other fluid sources for exemplary and non-limiting purposes will include compressed or liquified nitrogen, carbon dioxide, or other suitable fluids or fluid blends.

In some cases and with selection of appropriate materials, geometries, and thicknesses, a single fastening tab 31 in conjunction with mating geometry between seed collector 32 and shank structure 16 will be sufficient to secure seed orientation system 30 to shank structure 16, and still provide sufficient support for ground-contacting sub-furrow opener 35. Nevertheless, in other embodiments a seed orientation support structure, for exemplary and non-limiting purpose such as illustrated in our co-pending U.S. Patent Publication Nos. US2022/0192079A1 and US20200367425A1, will be provided to structurally support the more susceptible components such as sub-furrow opener 35. In such case, the seed orientation support structure may be connected to shank structure 16 at one or more locations and may also act to keep debris out of the furrow and to protect against rock impacts.

FIGS. 4-10 illustrate an embodiment seed receiver and path constrainer 20 in combination with seed orientation system 30. Seed orientation system 30 includes a seed collector 32 that directs seeds from seed source 10 to a seed entrance aperture 48 leading into seed orientation coil assembly 40. While a single fastening tab 31 is illustrated, in alternative embodiments seed collector 32 will include various holes, fasteners, tabs, indentations, flanges, insertions, or the like for connection to the seed source 10.

Adjacent to the upper end of seed collector 32, which in some embodiments is very close to the inlet of seeds from seed source 10, is seed receiver and path constrainer 20. As will be appreciated from a reading of the present disclosure, there are a variety of ways to constrain a seed upon the seed riding surface 92.

One way to constrain seeds upon seed riding surface 92 is to provide a non-linear seed path that always keeps the path surface interfering with the seed travel path, for exemplary and non-limiting purpose such as illustrated in our co-pending U.S. Patent Publication Nos. US2022/0192079A1 and US20200367425A1. Using this technique, the momentum of the seed keeps driving the seed into contact with seed riding surface 92. In the event of collision, some of the instability energy in the seed is lost. In one apparatus, at least one curve in seed riding surface 92 applies centrifugal force to the seed, continually tending to drive the seed against the seed path. With proper design, the curve will eventually dampen any oscillations between the seed and riding surface and thereby constrain the seed to the riding surface. While a simple curve can achieve this continuous interfering seed travel path, another particularly advantageous geometry for the seed riding surface 92 is that of a helix, such as helical pathway 90 illustrated in FIGS. 4-10.

In a similar manner, the orientation of the seed path can also take advantage of gravity to stabilize the oscillations of the seed by continuously pulling the seed toward the seed path. While this is similar in effect to that induced by centrifugal force, the forces due to gravity are relatively small and so require a long and less predictable path.

The provision of a very low friction seed riding surface 92 and a seed direction of travel that is very close to parallel to the seed riding surface 92 at the time of a collision will encourage the seed to skip and ultimately slide on seed riding surface 92, rather than bounce and tumble. This is similar to skipping a stone on water. With appropriate angle and surface friction, this combination will also lead to seed path constrainment.

Another way to constrain the seed to seed riding surface 92 is to use a pressure differential that will pull the seed into contact with seed riding surface 92, for exemplary and non-limiting purpose such as also illustrated in our co-pending U.S. Patent Publication Nos. US2022/0192079A1 and US20200367425A1. This is accomplished for exemplary and non-limiting purpose by providing seed riding surface 92 with vents and a pressure differential of relatively higher pressure where the vents meet seed riding surface 92 that the seed slides upon and a relatively lower pressure on the distal end of the vents. Note that this can be induced by pressurizing seed riding surface 92, such as by injecting pressurized air having a significant component perpendicular to and toward seed riding surface 92, and alternatively or additionally by drawing a vacuum at the end of the vents distal to seed riding surface 92.

Each of these aforementioned techniques are beneficial to seed path constrainment, and so in various embodiments of the present disclosure one or more of these will be incorporated. Nevertheless, allowing a seed to tumble, bounce, or otherwise take an indirect or varying path through any of seed source 10, seed receiver and seed path constrainer 20, and seed orientation system 30 can lead to substantial variation in time required to traverse seed riding surface 92. Said another way, a seed which follows a curved seed path between two points will require more travel time than a seed traveling at the same speed but that bounces off the seed path and thereby travels in a straight line between the same two points. This results in inconsistent seed spacing that can lead to undesirable crowding of seeds and commensurate greater-than-desired gaps. To limit the impact of this unpredictable seed path timing, slower planting speeds that are more tolerant of the timing variances has heretofore been required.

In accord with the teachings of the present disclosure, an embodiment seed receiver and seed path constrainer 20 will positively constrain seeds to seed riding surface 92. A moving contouring surface 21 that physically engages a seed and holds it against seed riding surface 92 is provided, thereby eliminating any bouncing, tumbling, or oscillation between the seed and seed riding surface 92. The contouring surface in one embodiment comprises a brush having resilient bristles extending radially from rotary axis 22. However, in some alternative embodiments contouring surface 21 will comprise a resilient or elastomeric material such as a foam rubber or elastic sheet. In yet further alternative embodiments, contouring surface 21 will include texture, for exemplary and non-limiting purpose small grooves, dimples, and other features that may, again for exemplary and non-limiting purpose, increase seed grab, accommodate seed irregularities, and the like. Nevertheless, such features are also selected to not interfere with the proper functioning of contouring surface 21 as otherwise described herein in certain embodiments.

Figure 10:
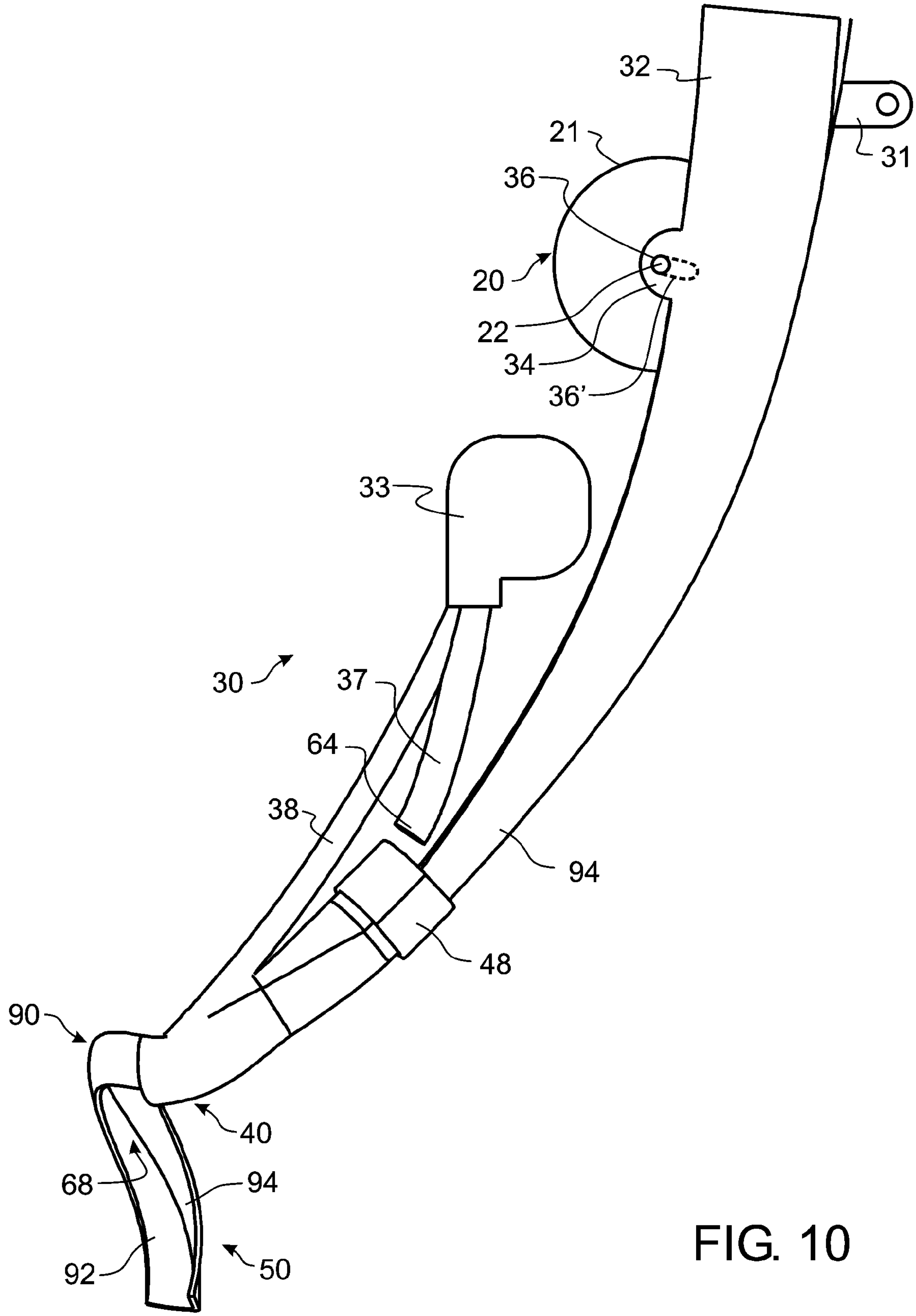

To set the spacing between contouring surface 21 and seed riding surface 92, any suitable support structure or apparatus may be provided. As illustrated in FIG. 10, in the seed collector 32 has been provided with a small tab 34 protruding therefrom that has a hole 36 therein, through which a suitable shaft or the like defining rotary axis 22 is passed and appropriately affixed.

The spacing of contouring surface 21 from seed riding surface 92 is selected so that a seed traversing seed riding surface 92 will be pressed into and held against seed riding surface 92 in a non-damaging manner, and will not be allowed to slip between contouring surface 21 and seed riding surface 92 without simultaneously contacting both. In one embodiment, this spacing is fixed by the diameter of contouring surface 21 and the distance hole 36 is spaced from seed riding surface 92, thereby simplifying the construction and operation of one embodiment seed receiver and seed path constrainer 20.

In some alternative embodiments, this spacing is adjustable to allow an operator to adjust the apparatus to constrain different types, geometries, or dimensions of seed. In such embodiments, for exemplary and non-limiting purpose, hole 36 may be oval or in the form of a slot 36' illustrated by dashed line in FIG. 10, and in such case the shaft defining rotary axis 22 may in some embodiments be provided with an adjustable fastener to allow selective repositioning of rotary axis 22 to different locations along the slot 36'.

In further alternative embodiments, a spring is provided to resiliently hold contouring surface 21 against seed riding surface 92. In some embodiments, rotary axis 22 will be provided with a sliding coupler into slot 36', to be able to slide within the slot 36'.

In yet further alternative embodiments, a sensor and automatically adjustable drive, for exemplary and non-limiting purposes such as a screw drive, are provided to automatically apply an appropriate force pressing contouring surface 21 against seed riding surface 92. As will be appreciated upon review and consideration of the aforementioned descriptions, there are many different spacing apparatuses known in the mechanical arts that are suitable and appropriate for different embodiments designed in accord with the teachings of the present disclosure.

In some embodiments, the spacing of contouring surface 21 from seed riding surface 92 can be set to disable contact therebetween, either manually or with automatic spacing control. In the event of a manually or automatically detected failure within seed receiver and seed path constrainer 20, such as a failure of contouring surface 21 to move or rotate, separating contouring surface 21 from seed riding surface 92 to allow seeds to pass therebetween will allow seeds to still pass through seed orientation system 30 and be planted in the earth. While proper seed orientation for the affected row unit may be diminished, planting may still proceed if the operator determines this to be most beneficial. As can be appreciated, in a situation with a limited planting window and any difficulty obtaining servicing or repair, down time can be more costly than a reduction of proper seed orientation in a single row. This can be particularly true in the case of a planter having many row units and only one malfunctioning row unit.

In addition to proper spacing, the stiffness and fill density of brush bristles is selected to prevent individual seeds from slipping between adjacent brush bristles and thereby potentially losing contact with seed riding surface 92. In those alternative embodiments that incorporate a resilient or elastomeric material such as a foam rubber or elastic sheet, the density or elasticity of the foam rubber or elastic sheet in the aforementioned alternative embodiments will similarly be selected to ensure that individual seeds simultaneously contact both contouring surface 21 and seed riding surface 92. This combination provides instantaneous contact and stabilization between the seed and seed riding surface 92. In addition, the resilience of contouring surface 21 facilitates fixed spacing between contouring surface 21 and seed riding surface 92 such as shown in FIG. 10. The inherent resilience will accommodate seed size variances and other dimensional variances or tolerances without requiring separate adjustment mechanisms.

Figure 4:
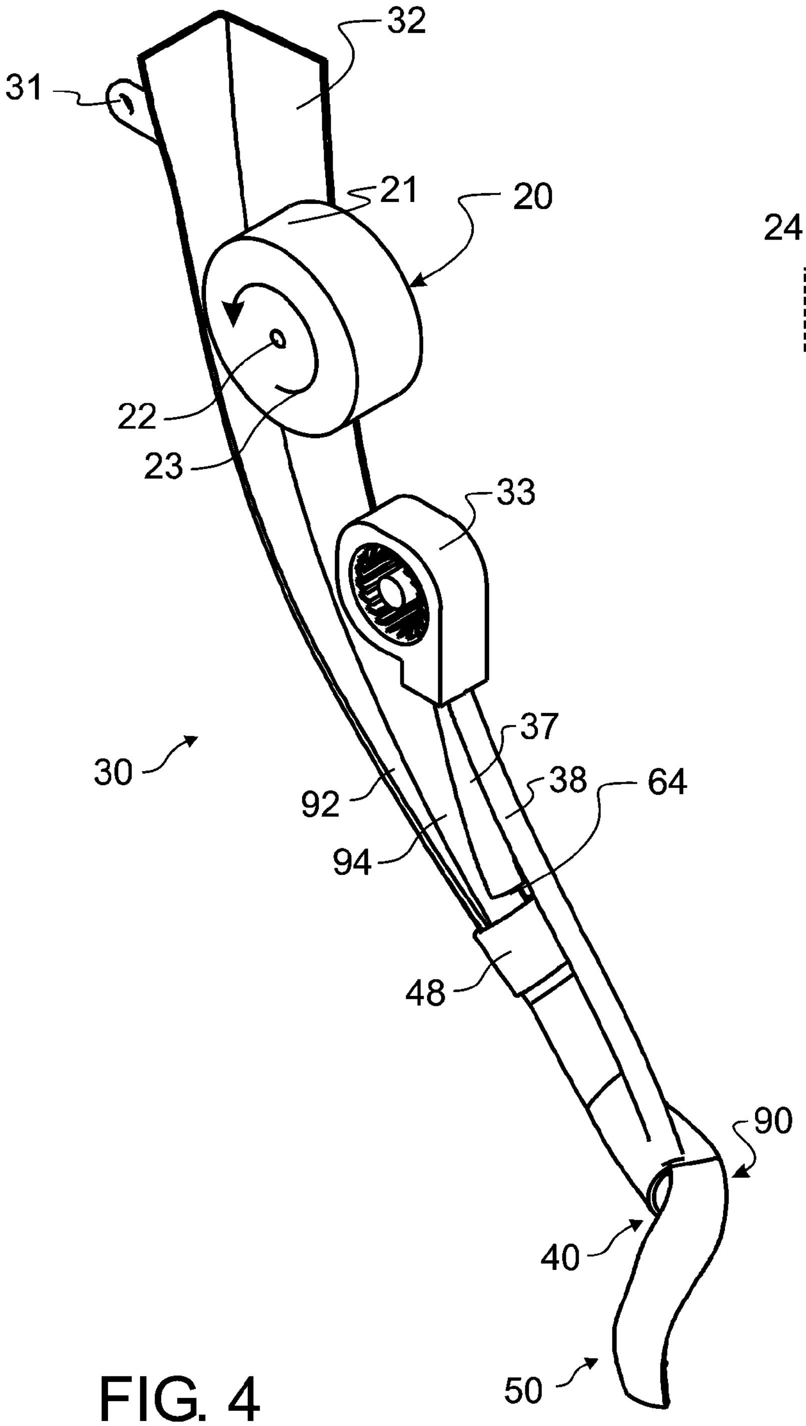

In one embodiment, seed receiver and seed path constrainer 20 is generally cylindrically shaped and rotates about rotary axis 22 in a circular manner, the direction identified by direction of rotation reference arrow 23 in FIG. 4. With this geometry, individual seeds will engage with both contouring surface 21 and seed riding surface 92 along a relatively narrow line of contact that is generally transverse to seed riding surface 92.

In alternative embodiments, the movement of contouring surface 21 may be some combination of linear or curved, such as in the manner of a belt or other geometry. The use of a belt or the like that follows the general shape of seed riding surface 92 provides a wider and more extended region of contact between the seed and both contouring surface 21 and seed riding surface 92. However, a belt or the like requires multiple axes of rotation and more complex fabrication, both adding to the cost and increasing the space required along seed riding surface 92 consumed by seed receiver and seed path constrainer 20.

In one embodiment illustrated in the Figures, the exit velocity of a seed departing contouring surface 21, including both direction and speed of travel, is selected and tightly controlled. In certain embodiments, contouring surface 21 will not only constrain the seed upon seed riding surface 92, but will also gently guide the seed into contact with seed guide wall 94.

As illustrated, adjacent to fastening tab 31 the seed collector 32 comprises a simple L-shaped surface. In alternative embodiments, seed collector 32 will comprise an enclosed tube, a U-shaped surface, or other suitable geometry. As understood from FIGS. 2 and 3, this upper region is held and enclosed within shank 16. However, also as visible in FIGS. 2 and 3, the lower portion of seed collector 32 intermediate between seed receiver and seed path constrainer 20 and seed entrance aperture 48 is also two-sided, though gradually twisted to impart a slight roll to the seed that will tend to hold the seed at the juncture between seed riding surface 92 and seed guide wall 94.

In addition to imparting a slight roll, seed riding surface 92 also incorporates a slight curvature in the lower portion of seed collector 32 intermediate between seed receiver and seed path constrainer 20 and seed entrance aperture 48 in certain embodiments. This curvature induces a gentle change in pitch that ensures the seed will remain constrained into seed riding surface 92. In one embodiment, the entire seed path along seed riding surface 92 subsequent to seed receiver and seed path constrainer 20 is provided.

While a single seed receiver and seed path constrainer 20 is illustrated, in some alternative embodiments two or more may be provided that at least in part oppose each other. In these alternative embodiments, the seed may at least momentarily be constrained between the opposing seed receiver and seed path constrainers 20. In some embodiments the rotary axes 22 are parallel to each other, while in other embodiments the rotary axes 22 are not, and instead define the geometry of a funnel that guides seed into a specific location on seed riding surface 92, for exemplary and non-limiting purpose such as both constrained upon seed riding surface 92 and in contact with seed guide wall 94.

Figure 5:
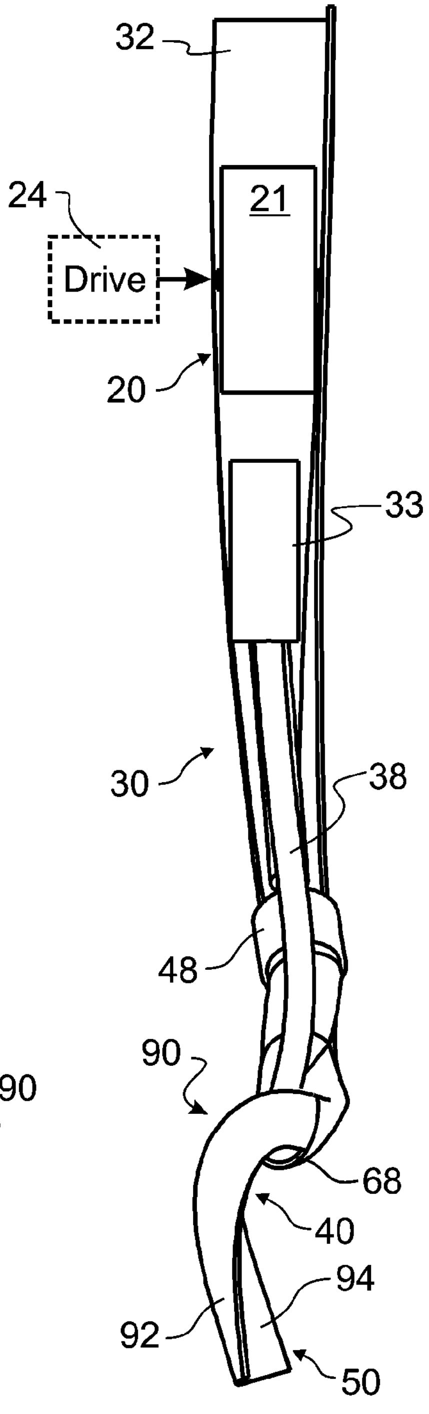
Figure 9:
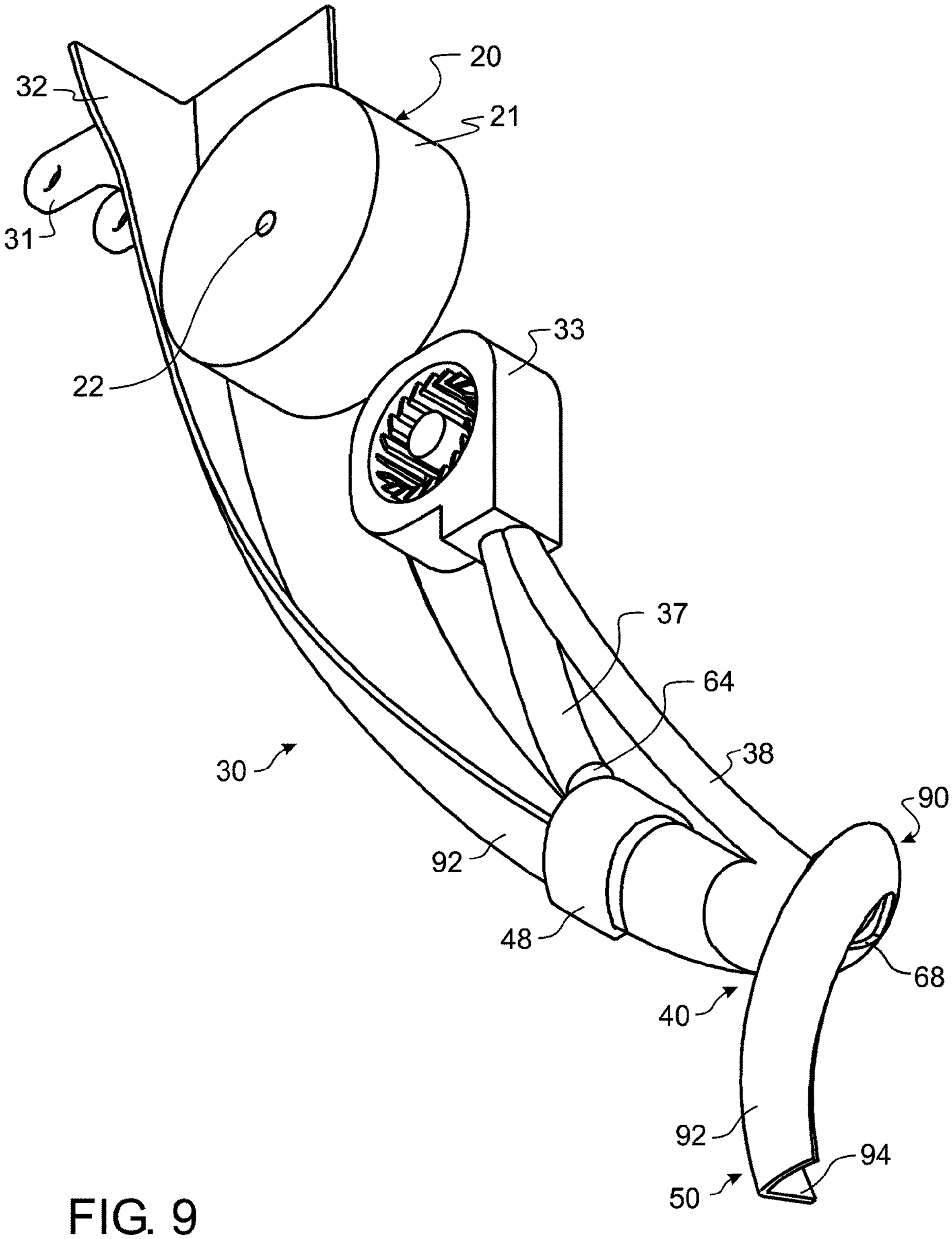

As illustrated in FIG. 5, any suitable drive 24 may be provided to rotate seed receiver and seed path constrainer 20. Nearly all modern agricultural row planting equipment is equipped with one or more of a suitable source of electricity, pressurized air, hydraulic fluid, and motive power. In consideration thereof, for exemplary and non-limiting purpose drive 24 may derive power from one of these sources and so comprise an electric motor, a pneumatic drive, a hydraulic drive, a friction wheel, a gear drive, or the like.

In one embodiment, drive 24 is a continuous drive, owing to relatively low cost, simplicity, ease of maintenance, repair, and replacement, and associated high reliability. In alternative embodiments, a stepped or intermittent drive 24 is provided, the movement which is controlled electronically or by other suitable apparatus. In such instances, seed timing and spacing may be tightly adjusted or controlled by stopping the drive momentarily to capture a seed, and then running drive 24 to advance the seed through the region of contact between the seed and both contouring surface 21 and seed riding surface 92. An intermittent drive 24 can be particularly beneficial for those applications when seeds are delivered from seed source 10 singulated, but without tightly controlled seed spacing.

As already suggested herein above, in an embodiment illustrated in the Figures, seed receiver and seed path constrainer 20 is provided in combination with one or more of the other ways to constrain seeds upon seed riding surface 92, including but not limited to: providing a non-linear seed path that always keep the path surface interfering with the seed travel path; orienting the seed path to gain the advantage of gravity to stabilize the oscillations of the seed by continuously pulling the seed toward the seed path; provision of a very low friction seed riding surface 92 and a seed direction of travel from seed source 10 into seed orientation system 30 that is very close to parallel to the seed riding surface 92; and providing a pressure differential that will pull the seed into contact with seed riding surface 92. Each of these techniques are beneficial to seed path constrainment, and so in various embodiments of the present disclosure one or more of these will be incorporated. By providing these additional beneficial techniques, the overall percentage of properly oriented seeds is increased and the length of seed riding surface 92 can be decreased. Furthermore, in the event of a failure within seed receiver and seed path constrainer 20 that requires disabling, there will still be provided an increased percentage of properly oriented seeds over randomly oriented seeds of the prior art row units.

In some alternative embodiments, and in addition to or alternatively to the aforementioned techniques, seed receiver and seed path constrainer 20 will comprise a seed riding surface 92 that has portions of or is entirely comprised of energy dampening materials such as foam, thin hollow and resilient surfaces, and brush riding surfaces that dissipate the energy of a bouncing oscillation of the seed. As already noted, a particularly critical and beneficial region of seed riding surface 92 that benefits from energy dampening materials is adjacent to the input from seed source 10.

In other alternative embodiments, and in addition to or alternatively to the aforementioned techniques, seed receiver and seed path constrainer 20 will comprise a seed riding surface 92 that has portions of or is entirely comprised of a travel path that uses the low pressure created by an airflow across seed riding surface 92 to pull the seed down to the riding surface.

In an embodiment seed orientation system 30, seed orientation coil 40 includes seed entrance aperture 48 through which seed from seed receiver and seed path constrainer 20 passes before traveling downstream to helical pathway 90. Air line 37 terminates at a nozzle 64 that injects air into seed entrance aperture 48 and onto seed riding surface 92. Spaced therefrom and adjacent to helical pathway 90 is a second nozzle that terminates air line 38. While two air lines and associated nozzles are illustrated, one or any suitable number of nozzles and air lines may be provided in alternative embodiments. Furthermore, the spacing between seed receiver and seed path constrainer 20 and nozzle 64 will be selected by a designer at design time. To reduce over length and maximize the opportunity for orientation, nozzle 64 will in some embodiments be located adjacent or closer to seed receiver and seed path constrainer 20.

The velocity of the air injected from air line 37 through nozzle 64 is selected to create a speed differential between air flow velocity and seed velocity sufficient to translate the seeds into the selected orientation, with seed tip forward and seed major surface sliding in contact with seed riding surface 92.

In the region adjacent to seed entrance aperture 48, seed riding surface 92 is fully enclosed and unvented. However, shortly thereafter as the seed begins to traverse helical pathway 90, the helical pathway is provided with an open side that acts as a vent 68. This surface may be entirely open. In alternative embodiments the surface is covered by an air-permeable surface that may for exemplary and non-limiting purpose comprise holes drilled with a laser, drill bit, chemical milling, or any other suitable technique. In yet other alternative embodiments, vent 68 is fabricated from a porous, micro-porous, or otherwise gas-permeable material which provides venting throughout the exterior wall, including for exemplary and non-limiting purpose: a porous material including but not limited to a mesh or screen; sintered metals; porous carbon; porous carbon-graphite; porous carbon-silicates; open-cell foams of any suitable composition; and other breathable materials and compositions. In some alternative embodiments, venting will be provided only selectively at strategic locations, or in other alternative embodiments entirely along seed riding surface 92.

The pressurized air jet released from air injector nozzle 64 acts upon seed to orient the seed in the selected tip-forward orientation. In contrast, the pressurized air jet released from air line 38 will follow within helical pathway 90 and will also be exposed to centrifugal force as the air stream contacts helical pathway 90. As a result, this air stream will interact with any seed traveling along seed riding surface 92. The upper inner region of helical pathway 90 is open to the atmosphere through vent 68. Consequently, some of the air traveling in the direction of helical pathway 90 but relatively more interior therefrom will peel away and travel out of vent 68. The result in some embodiments is that the highest velocity air stream will travel within helical pathway 90 very near to riding surface 92. In such embodiments, there will be a reduced lifting of the seed away from riding surface 92.

Helical pathway 90 may comprise any number of degrees of rotation, though as illustrated by approximately a slightly less than 360 degree rotation. The relatively small diameter helps to increase the centrifugal force applied to the seed and thereby improve seed stabilization. After passing through this vented helical pathway 90, seed will then pass into and through oriented seed exit path 50.

Oriented seeds are then transported from seed orientation system 30 into the ground in this tip-down, germ facing adjacent row orientation through seed exit path 50. Seed exit path 50 substantially reduces the application of forces to the seed or otherwise tightly controls the inertia of the seed prior to a final passage of the seed from the seed exit path into the furrow. Such forces, for exemplary and non-limiting purposes, may include sliding, centrifugal, and rolling forces that might lead to unpredictable yaw, pitch, and rolling of the seed. This control of forces and inertia ensures that the seed will move in a much more predictable and repeatable manner, and so will be much less prone to bouncing and tumbling unpredictably prior to being covered with earth by the closing apparatus.

In some embodiments, the seed will leave seed exit path 50 and then pass through an air gap prior to engaging with the furrow. The provision of an air gap enables a designer to provide separation between the seed exit path hardware and the earth, allowing the designer the luxury of not having to design the seed exit path for ground contact. In some of those embodiments that incorporate an air gap, seed exit path 50 will also incorporate an air stream configured to control forces and inertia of the seed within the air gap, to also improve movement of the seed in a much more predictable and repeatable manner.

In some embodiments, a seed sensor may be attached proximal to seed exit path 50 so as to monitor seed presence and flow, seed spacing, or other parameters useful to monitoring the proper operation of seed orientation system 30.

Further detail and description of the function of seed orientation system 30 and seed exit path 50 are provided in our co-pending U.S. Patent Publication Nos. US2022/0192079A1 and US20200367425A1. In addition to the embodiments of seed orientation system 30 illustrated and described herein, in yet further alternative embodiments other types of seed orientation systems will be used. For exemplary and non-limiting purpose, similar but alternative embodiment seed orientation systems include those illustrated in our co-pending U.S. Patent Publication Nos. US2022/0192079A1 and US20200367425A1. Other more diverse types of seed orientation systems, including but not solely limited to those described in the background section herein above, are also used in some alternative embodiments that will also benefit from the seed being constrained to the seed path by seed receiver and seed path constrainer 20.

As shown in the illustrations of FIGS. 4-10, there is an indeterminate distance between seed receiver and seed path constrainer 20 and seed orientation system 30 in certain embodiments. Similarly, there is an indeterminate distance between seed receiver and seed path constrainer 20 and a seed meter or like apparatus used for singulating seeds in certain embodiments. The provision of seed receiver and seed path constrainer 20 between a seed meter and seed orientation system 30 provides many benefits, as already described herein above. By affixing seed collector 32 to shank structure 16 or the like, seed receiver and seed path constrainer 20 may be used to collect and constrain seed from many diverse seed sources 10, with generally minor or no differences required to accommodate different manufacturer or geometry.

However, the present inventors also recognize that for some seed sources it is desirable to gather and constrain the seed as early as possible. Such is commonly the case with seed meters and the like. Since the seed meter provides the precise timing required for proper spacing during high speed planting, such timing will be maintained if each seed is constrained to and travels the same path as every other seed. Where possible, such as when integrating the present design directly into the design of the seed meter or other seed source 10, seed receiver and seed path constrainer 20 will be located immediately adjacent to the seed meter or like source. In such case, in many embodiments the length of seed riding surface 92 will be extended to run substantially from the seed meter to an exit from seed exit path 50.

EXAMPLES

The following are nonlimiting examples.

Example 1—an agricultural planter, comprising: a seed source configured to provide at least one seed; a seed orientation system having a seed path upon which the at least one seed traverses that is configured to orient the at least one seed upon the seed path in a selected orientation, and a seed exit path configured to deposit the oriented seed into a seed trench in a selected planting orientation; and a seed receiver and path constrainer configured to receive the at least one seed from the seed source and constrain the at least one seed to the seed path.

Example 2—the agricultural planter of Example 1, wherein the seed path comprises at least one curve.

Example 3—the agricultural planter of Example 2, wherein the seed path comprises a helix.

Example 4—the agricultural planter of Example 2, wherein the seed orientation system further comprises a pressurized air system to direct an air flow along the curved path in a direction configured to accelerate the seed toward the seed trench.

Example 5—the agricultural planter of Example 1, wherein the seed receiver and path constrainer comprises a moving contouring surface configured to engage and slide the at least one seed along the seed path.

Example 6—the agricultural planter of Example 5, wherein the moving contouring surface comprises: at least one cylindrical body having a cylinder axis, and a resilient cylindrical surface; and a drive configured to rotate the at least one cylindrical body about the cylinder axis.

Example 7—the agricultural planter of Example 6, wherein the resilient cylindrical surface further comprises a surface texture.

Example 8—the agricultural planter of Example 6, wherein the at least one cylindrical body further comprises a resilient composition.

Example 9—the agricultural planter of Example 6, wherein the at least one cylindrical body further comprises a brush having resilient bristles extending radially from the cylinder axis.

Example 10—the agricultural planter of Example 6, wherein the seed receiver and path constrainer further comprises a fixed spacing between the resilient cylindrical surface and the seed path.

Example 11—the agricultural planter of Example 6, wherein the seed receiver and path constrainer further comprises an adjustable spacing between the resilient cylindrical surface and the seed path.

Example 12—the agricultural planter of Example 6, wherein the seed receiver and path constrainer further comprises a second moving contouring surface configured to engage and slide the at least one seed along the seed path, the second moving contouring surface having: a second cylindrical body having a cylinder axis, and a resilient cylindrical surface; and a second drive configured to rotate the second cylindrical body about the second cylinder axis in a direction of rotation opposite to a direction of rotation of the at least one cylindrical body direction of rotation; the at least one seed captured between and moved by the at least one cylindrical body resilient cylindrical surface and the second cylindrical body resilient cylindrical surface toward the seed trench.

Example 13—the agricultural planter of Example 5, wherein the at least one seed passes between the moving contouring surface and the seed path while remaining in contact with the moving contouring surface and the seed path, and the at least one seed is moved by the moving contouring surface toward the seed trench.

Example 14—the agricultural planter of Example 1, wherein the moving contact surface further comprises an endless belt.

Example 15—an agricultural row unit for planting seeds, comprising: a frame configured to be coupled to a toolbar; a seed-trench opening assembly carried by the frame and configured to form a seed trench; a seed-delivery device carried by the frame and configured to deliver seeds to the seed trench, the seed-delivery device having a seed reservoir containing a plurality of seeds, a seed meter configured to receive and singulate the seeds, a seed orientation system having a curved seed path upon which the singulated seeds traverse that is configured to orient the singulated seeds upon the seed path in a selected orientation, an air flow directed along the curved path configured to entrain and accelerate the singulated seeds, and a seed exit path configured to deposit the oriented singulated seeds into the seed trench in a selected planting orientation, and seed receiver and path constrainer configured to receive the singulated seeds from the seed source and constrain the singulated seeds to the seed path; and a seed-trench closing assembly carried by the frame and configured to close the seed trench over seeds in the seed trench.

Example 16—the agricultural row unit of Example 15, wherein the curved seed path further comprises a helix.

Example 17—the agricultural row unit of Example 15, wherein the seed receiver and path constrainer comprises a moving contouring surface configured to engage and slide the at least one seed along the seed path.

Example 18—the agricultural row unit of Example 17, wherein the at least one seed passes between the moving contouring surface and the seed path while remaining in contact with the moving contouring surface and the seed path, and the at least one seed is moved by the moving contouring surface toward the seed trench.

Example 19—a method of planting with a row unit, comprising the steps of: forming a seed trench in soil with the row unit; singulating seeds with a seed meter carried by the row unit; transferring singulated seeds from the seed meter to a seed path; capturing the singulated seeds between the seed path and a seed path constrainer that moves relative to the seed path and thereby constraining the singulated seeds to the seed path; entraining and accelerating the constrained singulated seeds upon the seed path in an air stream; orienting the constrained singulated seeds within the seed path; dispensing the oriented constrained singulated seeds from the seed path into the seed trench; and closing the seed trench with a seed-trench closing assembly.

Example 20—the method of planting with a row unit of Example 19, wherein the step of orienting the constrained singulated seeds within the seed path further comprises the step of applying a centrifugal force to the constrained singulated seeds within the seed path.

Example 21—an agricultural row unit for planting seeds, comprising: a frame configured to be coupled to a toolbar; a seed-trench opening assembly carried by the frame and configured to form a seed trench; a seed-delivery device carried by the frame and configured to deliver seeds to the seed trench, the seed-delivery device having a seed reservoir containing a plurality of seeds, a seed meter configured to receive and singulate the plurality of seeds, a seed tube receiving singulated seeds of the plurality of seeds from the seed meter, a seed orientation system having a curved seed path receiving singulated seeds of the plurality of seeds from the seed tube and upon which the singulated seeds of the plurality of seeds traverse that is configured to orient the singulated seeds of the plurality of seeds upon the seed path in a selected orientation, an air flow directed along the curved path configured to entrain and accelerate the singulated seeds of the plurality of seeds, and a seed exit path configured to deposit the oriented singulated seeds into the seed trench in a selected planting orientation, and a seed receiver and path constrainer configured to receive the singulated seeds from the seed source and constrain the singulated seeds to the seed path; and a seed-trench closing assembly carried by the frame and configured to close the seed trench over seeds in the seed trench.

Example 22—an agricultural row unit for planting seeds, comprising: a frame configured to be coupled to a toolbar; a seed-trench opening assembly carried by the frame and configured to form a seed trench; a seed-delivery device carried by the frame and configured to deliver seeds to the seed trench, the seed-delivery device having a seed reservoir containing a plurality of seeds, a seed meter configured to receive and singulate the plurality of seeds, a seed orientation system having a curved seed path coupled directly with and receiving singulated seeds of the plurality of seeds directly from the seed meter and upon which the singulated seeds traverse that is configured to orient the singulated seeds upon the seed path in a selected orientation, an air flow directed along the curved path configured to the singulated seeds, and a seed exit path configured to deposit the oriented singulated seeds into the seed trench in a selected planting orientation, and a seed receiver and path constrainer configured to receive the singulated seeds from the seed source and constrain the singulated seeds to the seed path; and a seed-trench closing assembly carried by the frame and configured to close the seed trench over seeds in the seed trench.

Example 23—an agricultural planter, comprising: a seed source configured to provide at least one seed; a seed orientation system having a seed path upon which the at least one seed traverses that is configured to orient the at least one seed upon the seed path in a selected orientation, and a seed exit path configured to deposit the oriented seed into a seed trench in a selected planting orientation; and a seed receiver and path constrainer having a contouring surface moving relative to the seed path configured in a first operative position to receive the at least one seed from the seed source, engage and slide the at least one seed along the seed path, and constrain the at least one seed to the seed path, and configured in a second non-operative position that is separated from the at least one seed sliding along the seed path.

Example 24—an agricultural planter, comprising: a seed source configured to provide at least one seed; and a seed orientation system having a seed path upon which the at least one seed traverses that is configured to orient the at least one seed upon the seed path in a selected orientation, a seed exit path configured to deposit the oriented seed into a seed trench in a selected planting orientation, and an air flow directed along the seed exit path configured to entrain the at least one seed in the seed exit path.

The terminology used herein is for the purpose of describing particular embodiments only and is not intended to be limiting of the invention. As used herein, the term "and/or" includes any and all combinations of one or more of the associated listed items. As used herein, the singular forms "a,", "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence of or addition of one or more other features, steps, operations, elements, components, and/or groups thereof.

Unless otherwise defined, all terms including technical and scientific terms used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

What is claimed is:

1. An agricultural planter, comprising:
- a seed source configured to provide at least one seed;
- a seed orientation system including a seed path, the seed path including a seed riding surface upon which the at least one seed traverses, the seed riding surface having at least one curve that imparts a centrifugal force on the at least one seed such that the at least one seed orients upon the seed path in a selected orientation;
- a seed exit path configured to deposit the oriented seed into a seed trench in a selected planting orientation; and
- a seed receiver and path constrainer configured to receive the at least one seed from the seed source and constrain the at least one seed to the seed path.

2. The agricultural planter of claim 1, wherein the at least one curve is a helix.

3. The agricultural planter of claim 1, wherein the seed orientation system further comprises a pressurized air system to direct an air flow along the seed path in a direction configured to accelerate the seed toward the seed trench.

4. The agricultural planter of claim 1, wherein the seed receiver and path constrainer comprises a moving contouring surface configured to engage and slide the at least one seed along the seed riding surface.

5. The agricultural planter of claim 4, wherein the moving contouring surface comprises:
- at least one cylindrical body having a cylinder axis, and a resilient cylindrical surface; and
- a drive configured to rotate the at least one cylindrical body about the cylinder axis.

6. The agricultural planter of claim 5, wherein the resilient cylindrical surface further comprises a surface texture.

7. The agricultural planter of claim 5, wherein the at least one cylindrical body further comprises a resilient composition.

8. The agricultural planter of claim 5, wherein the at least one cylindrical body further comprises a brush having resilient bristles extending radially from the cylinder axis.

9. The agricultural planter of claim 5, wherein the seed receiver and path constrainer further comprises a fixed spacing between the resilient cylindrical surface and the seed riding surface.

10. The agricultural planter of claim 5, wherein the seed receiver and path constrainer further comprises an adjustable spacing between the resilient cylindrical surface and the seed riding surface.

11. The agricultural planter of claim 5, wherein the seed receiver and path constrainer further comprises a second moving contouring surface configured to engage and slide the at least one seed along the seed riding surface, the second moving contouring surface having:
- a second cylindrical body having a cylinder axis, and a resilient cylindrical surface; and
- a second drive configured to rotate the second cylindrical body about the second cylinder axis in a direction of rotation opposite to a direction of rotation of the at least one cylindrical body direction of rotation;

the at least one seed captured between and moved by the at least one cylindrical body resilient cylindrical surface and the second cylindrical body resilient cylindrical surface toward the seed trench.

12. The agricultural planter of claim 4, wherein the at least one seed passes between the moving contouring surface and the seed riding surface while remaining in contact with the moving contouring surface and the seed riding surface, and the at least one seed is moved by the moving contouring surface toward the seed trench.

13. The agricultural planter of claim 4, wherein the moving contouring surface comprises an endless belt.

14. An agricultural row unit for planting seeds, comprising:

a frame configured to be coupled to a toolbar;

a seed-trench opening assembly carried by the frame and configured to form a seed trench;

a seed-delivery device carried by the frame and configured to deliver seeds to the seed trench, the seed-delivery device having a seed reservoir containing a plurality of seeds, and a seed meter configured to receive and singulate the seeds;

a seed orientation system including a seed path, the seed path including a seed riding surface upon which the singulated seeds traverse, the seed riding surface having at least one curve that imparts a centrifugal force on the singulated seeds such that the singulated seeds orient upon the seed path in a selected, orientation;

an air flow directed along the seed path configured to entrain and accelerate the singulated seeds;

a seed exit path configured to deposit the oriented singulated seeds into the seed trench in a selected planting orientation;

a seed receiver and path constrainer configured to receive the singulated seeds from the seed meter and constrain the singulated seeds to the seed riding surface; and a seed-trench closing assembly carried by the frame and configured to close the seed trench over the singulated seeds deposited into the seed trench.

15. The agricultural row unit of claim 14, wherein the at least one curve is a helix.

16. The agricultural row unit of claim 14, wherein the seed receiver and path constrainer comprises a moving contouring surface configured to engage and slide the singulated seeds along the seed riding surface.

17. The agricultural row unit of claim 16, wherein the singulated seeds pass between the moving contouring surface and the seed riding surface while remaining in contact with the moving contouring surface and the seed riding surface, and the singulated seeds are moved by the moving contouring surface toward the seed trench.

18. A method of planting with a row unit, comprising the steps of:

forming a seed trench in soil with the row unit;

singulating seeds with a seed meter carried by the row unit;

transferring singulated seeds from the seed meter to a seed path, the seed path including a seed riding surface upon which the singulated seeds traverse, the seed riding surface having at least one curve that imparts a centrifugal force on the singulated seeds such that the singulated seeds orient upon the seed path in a selected orientation;

capturing the singulated seeds between the seed riding surface and a seed path constrainer that moves relative to the seed riding surface and thereby constraining the singulated seeds to the seed riding surface;

entraining and accelerating the constrained singulated seeds upon the seed path in an air stream;

depositing the oriented constrained singulated seeds from the seed path into the seed trench; and closing the seed trench over the singulated seeds deposited into the seed trench with a seed-trench closing assembly.

19. An agricultural row unit for planting seeds, comprising:

a frame configured to be coupled to a toolbar;

a seed-trench opening assembly carried by the frame and configured to form a seed trench;

a seed-delivery device carried by the frame and configured to deliver seeds to the seed trench, the seed-delivery device including:

a seed reservoir containing a plurality of seeds;

a seed meter configured to receive the plurality of seeds and dispense singulated seeds; and a seed tube receiving the singulated seeds from the seed meter;

a seed orientation system including a seed path receiving the singulated seeds from the seed tube, the seed path including a seed riding surface upon which the singulated seeds traverse, the seed riding surface having at least one curve that imparts a centrifugal force on the at least one seed such that the singulated seeds orient upon the seed path in a selected orientation;

an air flow directed along the seed path configured to entrain and accelerate the singulated seeds;

a seed receiver and path constrainer configured to receive the singulated seeds from the seed tube and constrain the singulated seeds to the seed path;

a seed exit path configured to deposit the oriented singulated seeds into the seed trench in a selected planting orientation, and a seed-trench closing assembly carried by the frame and configured to close the seed trench over the singulated seeds deposited into the seed trench.

20. An agricultural row unit for planting seeds, comprising:

a frame configured to be coupled to a toolbar;

a seed-trench opening assembly carried by the frame and configured to form a seed trench;

a seed-delivery device carried by the frame and configured to deliver seeds to the seed trench, the seed-delivery device having a seed reservoir containing a plurality of seeds, and a seed meter configured to receive the plurality of seeds and dispense singulated seeds;

a seed orientation system including a seed path coupled directly with and receiving the singulated seeds directly from the seed meter, the seed path including a seed riding surface upon which the singulated seeds traverse, the seed riding surface having at least one curve that imparts a centrifugal force on the at least one seed such that the singulated seeds orient upon the seed path in a selected orientation;

an air flow directed along the seed path, the air flow configured to entrain and accelerate the singulated seeds;

a seed receiver and path constrainer configured to receive the singulated seeds from the seed meter and constrain the singulated seeds to the seed path;

a seed exit path configured to deposit the oriented singulated seeds into the seed trench in a selected planting orientation, and a seed-trench closing assembly carried by the frame and configured to close the seed trench over the singulated seeds deposited into the seed trench.

21. An agricultural planter, comprising:

a seed source configured to provide at least one seed;

a seed orientation system including a seed path, the seed path including a seed riding surface upon which the at least one seed traverses, the seed riding surface having at least one curve that imparts a centrifugal force on the at least one seed such that the at least one seed orients upon the seed path in a selected orientation;

a seed receiver and path constrainer having a contouring surface moving relative to the seed riding surface configured in a first operative position to receive the at least one seed from the seed source, engage and slide the at least one seed along the seed riding surface, and constrain the at least one seed to the seed path, and configured in a second non-operative position that is separated from the at least one seed sliding along the seed riding surface;

a seed exit path configured to deposit the oriented seed into a seed trench in a selected planting orientation.

22. An agricultural planter, comprising:

a seed source configured to provide at least one seed; and a seed orientation system including a seed path, the seed path including a seed riding surface upon which the at least one seed traverses, the seed riding surface having at least one curve that imparts a centrifugal force on the at least one seed such that the at least one seed orients upon the seed path in a selected orientation;

an air flow directed along the seed exit path configured to entrain the at least one seed in the seed exit path;

a seed exit path configured to deposit the oriented seed into a seed trench in a selected planting orientation.

* * * * *